(12) United States Patent
Slaughter et al.

(10) Patent No.: US 7,686,608 B2
(45) Date of Patent: *Mar. 30, 2010

(54) APPARATUS AND METHODS FOR DISTRIBUTING A SUBSTANCE

(75) Inventors: Steven P. Slaughter, Palmdale, CA (US); John C. Fish, Santa Clarita, CA (US); Susan N. Clarkson, Newhall, CA (US)

(73) Assignee: Lockheed-Martin Corporation, Bethesda, MD (US)

( * ) Notice: Subject to any disclaimer, the term of this patent is extended or adjusted under 35 U.S.C. 154(b) by 1425 days.

This patent is subject to a terminal disclaimer.

(21) Appl. No.: 10/958,961

(22) Filed: Oct. 5, 2004

(65) Prior Publication Data

US 2005/0040553 A1 Feb. 24, 2005

Related U.S. Application Data

(63) Continuation-in-part of application No. 10/641,683, filed on Aug. 14, 2003, now Pat. No. 7,147,448.

(51) Int. Cl.
*B29C 45/03* (2006.01)
*B29C 31/04* (2006.01)
*B29C 70/00* (2006.01)

(52) U.S. Cl. .................. 425/543; 425/129.1; 264/316; 264/37.18; 264/257

(58) Field of Classification Search .................. 425/544, 425/388, 405.1, 215, 217, 129.1, 543; 264/511, 264/316, 258
See application file for complete search history.

(56) References Cited

U.S. PATENT DOCUMENTS

| | | | | | |
|---|---|---|---|---|---|
| 2,913,036 | A | * | 11/1959 | Smith | 264/102 |
| 3,464,677 | A | * | 9/1969 | Sutter | 366/17 |
| 4,902,215 | A | * | 2/1990 | Seemann, III | 425/406 |
| 5,080,851 | A | * | 1/1992 | Flonc et al. | 264/258 |
| 5,403,537 | A | * | 4/1995 | Seal et al. | 264/511 |
| 5,904,972 | A | * | 5/1999 | Tunis et al. | 428/178 |
| 6,096,669 | A | * | 8/2000 | Colegrove et al. | 442/366 |

OTHER PUBLICATIONS

Nielsen, D.R., and R. Pitchumani, Closed-loop flow control in resin transfer molding using real-time numerical process simulations, Composites Science and Technology, vol. 62 (2002), pp. 283-298.*

* cited by examiner

*Primary Examiner*—Matthew J. Daniels
(74) *Attorney, Agent, or Firm*—Koestner Bertani LLP

(57) ABSTRACT

A system for distributing a substance includes a chamber configured to accommodate a mold surface and an inlet port in the chamber. The substance is introduced into the chamber through the inlet port. Flexible tubing is coupled between the inlet port and a reservoir containing the substance. A pump is used to compress a portion of the flexible tubing to move the substance through the tubing and inject the substance into the chamber.

27 Claims, 5 Drawing Sheets

APPARATUS AND METHODS FOR DISTRIBUTING A SUBSTANCE

CROSS-REFERENCE TO RELATED APPLICATIONS

This application is a continuation-in-part of patent application Ser. No. 10/641,683, entitled "Apparatus and Method for Distributing a Substance" naming Steve Slaughter, John C. Fish, and Susan N. Clarkson as inventors, which is assigned to the same assignee as the present disclosure, and is hereby incorporated by reference.

BACKGROUND

Resin transfer molding, also commonly referred to as RTM, is a process that applies resin to a reinforcement, typically a woven or non-woven reinforcement. When molding, the reinforcement is usually placed on the lower mold, the mold halves clamped together, and resin pumped into the molds under pressure. A compressible seal is built into the mold around the part periphery, with provisions for allowing air to escape while containing the resin.

Resin transfer molding apparatuses typically use a small metering pump that includes a resin cylinder for one-part systems, and separate resin and catalyst cylinders for two-part resin systems. A hand-held static mixer is placed adjacent to or is temporarily fastened to an injection port on the mold. The metering cylinders are cycled until a predetermined volume of resin has been delivered into the mold. The static mixer then is withdrawn and flushed out. Simpler VARTM and RTM systems MAY use pre-mixed resins which have a suitably long working time after mixing Generally, vacuum assisted resin transfer molding (VARTM) processes include layers of a material of an unimpregnated fiber and/or fabric on top of a mold. A vacuum bag is placed around the lay-up and sealed to the mold. A peel ply may be placed on top of the lay-up and between the layers and mold surface to insure that the vacuum bag can be removed from the completed part and that the part can be removed from the mold. Resin is introduced into the vacuum bag while a vacuum is drawn from beneath the lay-up to cause the resin to flow through the lay-up. Thereafter, the resin flow is terminated and the resin in the assembly is cured, which in some circumstances may require heating the resin to curing temperature. To insure even distribution of resin into the lay-up, a resin distribution medium is placed on top of the lay-up, which is designed to cause the resin to evenly distribute there across eliminating resin-starved areas. It is difficult to ensure complete and even infusion of resin in VARTM systems, however. Also, resin tends to be left in the supply channels and pulled into the vacuum source, which requires additional clean-up that increases costs and can create additional emission of fumes.

There are a variety of resin transfer molding, VARTM, and resin infusion apparatuses. Practitioners have generally not distinguished the type of pump technology that they have used. Frequently, the RTM and VARTM patents have explored alternate ways of distributing resin within the chamber or of creating the forms, but merely refer to "means for providing vacuum" on the chamber.

In traditional resin application systems, excess resin is collected from an application chamber and either disposed of or manually transferred to the supply chamber for the substance. In the VARTM process, it is typical for a trap to be attached to the application chamber. A vacuum system is then used to draw resin into the trap. The trap is intended to prevent substance from being drawn into the vacuum system as it evacuates the application chamber. When it is necessary to move the resin from the trap or other collection vessel to the supply chamber, feed and vacuum tubes are typically closed off by use of valves or clamps. Often, the resin is then collected in a vessel and physically transported to the supply chamber.

In cases where the substance, such as resin, is physically transported in a vessel, the operator must pay ongoing attention to the changing level of the substance in the vessel to avoid an overflow and waste of the substance. An additional disadvantage to the physical handling of a substance in an open vessel is that the substance is exposed to atmospheric air and moisture or dryness that can degrade the substance.

SUMMARY

In some embodiments, a system for distributing a substance includes a chamber configured to accommodate a mold surface and an inlet port in the chamber. The substance is introduced into the chamber through the inlet port. Flexible tubing is coupled between the inlet port and a reservoir containing the substance. A pump is used to compress a portion of the flexible tubing to move the substance through the tubing and inject the substance into the chamber.

In other embodiments, a method for distributing a substance includes coupling a flexible tube between a peristaltic pump and an airtight chamber. One end of the flexible tube is configured to draw the substance from a reservoir and the other end of the flexible tube is configured to input the substance into the chamber. A peristaltic pump to forms a differential pressure within the chamber

BRIEF DESCRIPTION OF THE DRAWINGS

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION

Figure 1A:
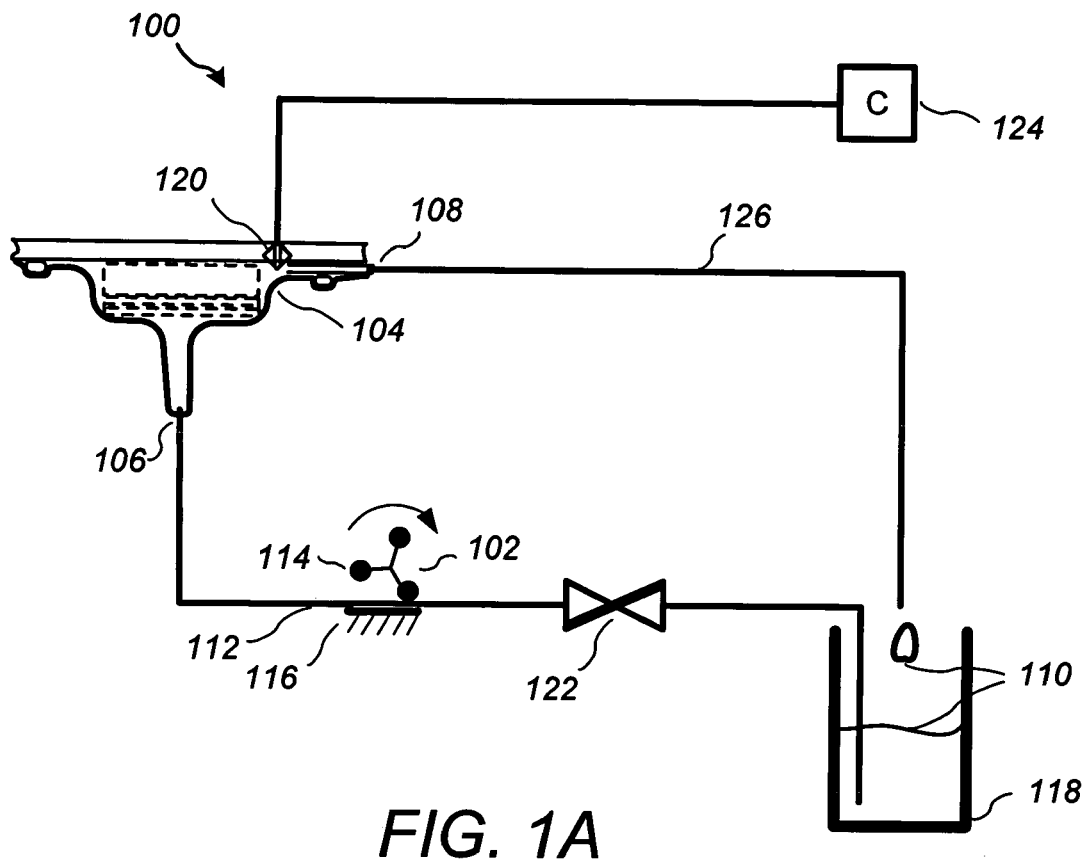
FIG. 1A is a schematic diagram of an embodiment of a system for distributing a substance with a peristaltic pump providing positive pressure.

An embodiment of a system 100 that includes a pump 102 for controlling flow and recirculating substances is shown in FIG. 1A. Peristaltic pump 102 creates a differential pressure between chamber 104 and atmospheric pressure outside chamber 104. Inlet port 106 and outlet port 108 allow substance 110 to flow into and out of chamber 104, which can be any suitable rigid or flexible structure capable of withstanding the pressure differential. A flexible chamber 104 is typically used when vacuum pressure is applied, whereas rigid chambers 104 can be used in the presence of positive pressures to retain the desired shape. Outlet port 108 can allow escape of both pressure and the substance 110 from chamber 104.

In some embodiments, pump 102 is a peristaltic pump that moves substance 110 through tubing 112 while avoiding direct contact of substance 110 with components of pump 102. Substance 110 can include particulate matter. In some embodiments, peristaltic pump 102 includes one or more pressure rollers 114 that contact a portion of the length of tubing 112 to force substance 110 through tubing 112. The rollers 114 typically rotate in a circular path to compress flexible tubing 112 at spaced intervals against a surface 116. The flattened portion of tubing 112 decompresses to due to the resilience of tubing 112, thereby drawing additional substance 110 into the vacated portion of tubing 112

Tubing 112 isolates substance 110 from pump 102, thus allowing pump 102 to continue operating even if substance 110 begins to gel. Tubing 112 can help protect pump 102 from any corrosive substances, and minimizes clean-up.

Figure 3A:
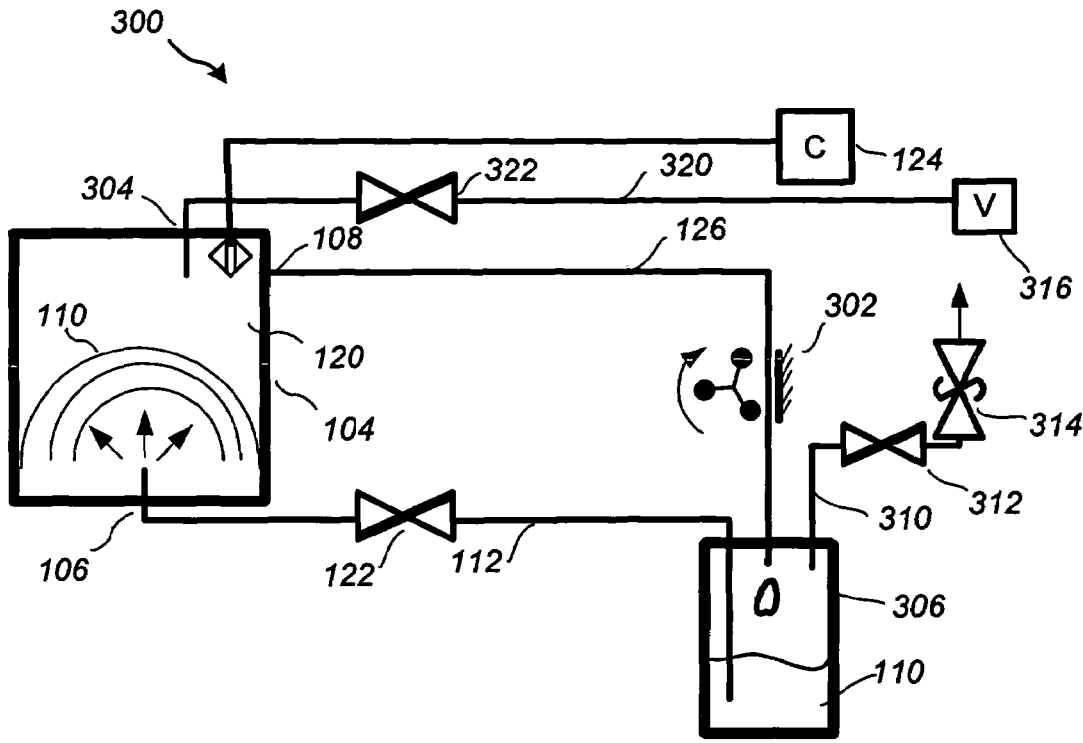
FIG. 3A is a schematic diagram of an embodiment of a system for distributing a substance with a peristaltic pump providing negative pressure.
Figure 3B:
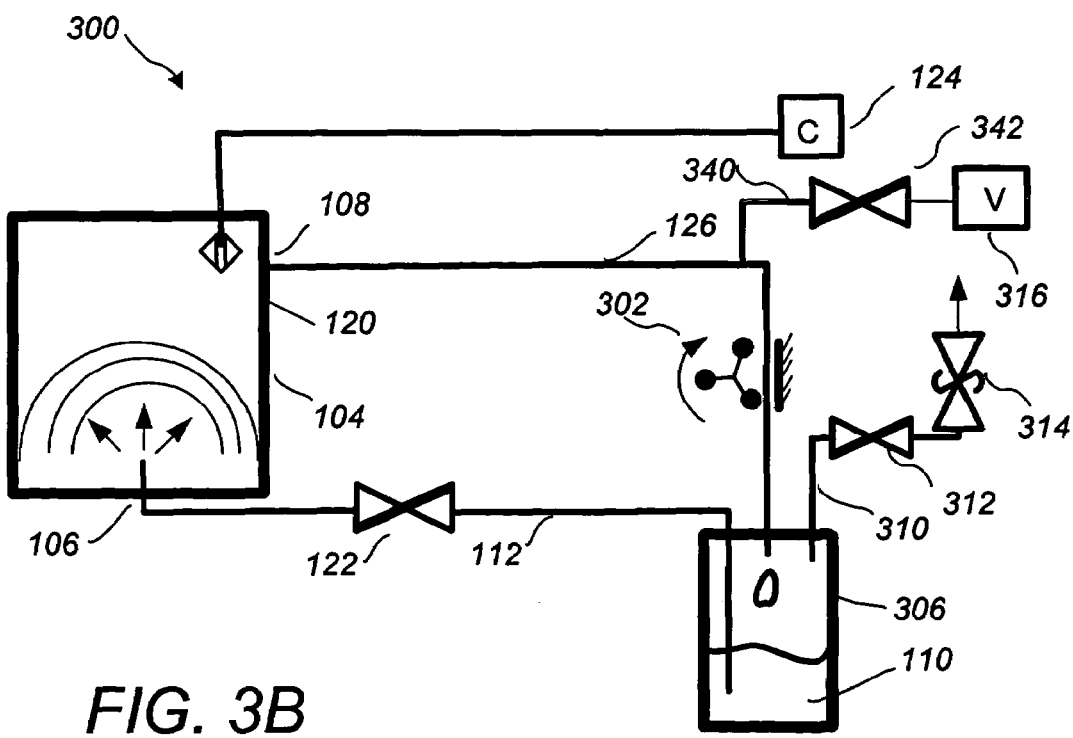
FIG. 3B is a schematic diagram of another embodiment of a system for distributing a substance with a peristaltic pump providing negative pressure.
Figure 3C:
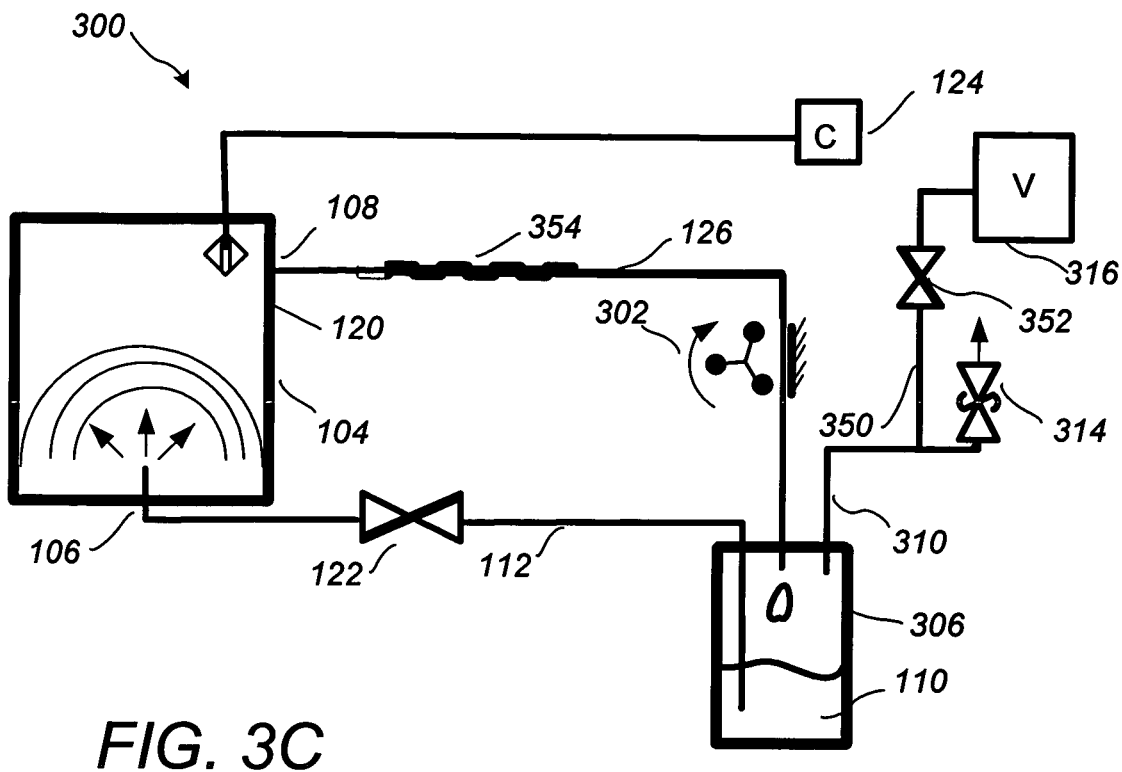
FIG. 3C is a schematic diagram of another embodiment of a system for distributing a substance with a peristaltic pump providing negative pressure.

One end of tubing 112 is placed in supply reservoir 118, which can be any suitable vessel capable of containing substance 110. Supply reservoir 118 can be open to the atmosphere, as indicated in FIG. 1A, or closed, as indicated in FIGS. 3A-3C. Heating or refrigerating components (not shown) can be included in system 100 to maintain substance 110 in reservoir 118 at a desired temperature.

In some embodiments, one or more sensors 120 can be placed in chamber 104 to detect a build-up of substance 110. Sensor 120 can be located adjacent to outlet port 108, or other suitable location in chamber 104, such as where substance 110 tends to accumulate. In some embodiments, a flow restrictor 122, such as a clamp, valve, or other suitable mechanism, can be coupled to restrict the flow of substance 110 through tube 112, thereby controlling the flow of substance 110 to chamber 104.

Pump 102 and restrictor 122 can be configured to receive signals from a controller 124 to control the operation of pump 102 and restrictor 122. Controller 124 can start, stop, and adjust the operating speed of pump 102 and/or restrictor 122 based on feedback from sensors 120 to control the amount of substance introduced to chamber 104. In addition, the injection rate and pressure of substance 110 can be adjusted to achieve consistent distribution of substance 110.

Any suitable pump 102 can be utilized in system 100, such as one or peristaltic pumps available from Randolph Austin, Inc., of Manchaca, Tex. Pump 102 can be powered by air, electricity, or any other suitable means. Air-powered pumps have the advantage of tolerating stalls. Electric powered pumps are generally more controllable. Additionally, tubing specifically designed for peristaltic pumps can be utilized as tubing 112 in order to maximize the lifetime of the apparatus and minimize accidental ruptures of tubing 112. In addition, commercially available peristaltic tubing is made from a variety of materials that are designed to accommodate various substances.

In some embodiments, system 100 includes a discharge tube 126 coupled between outlet port 108 and reservoir 118. One end of discharge tube 126 can direct excess substance 110 from chamber 104 into a disposal area, such as a sewer, a sump, bucket, drum, or other device suitable for collecting substance 110. The excess substance 110 collected in the disposal area can be added to supply reservoir 118 for recycling through system 100.

In other embodiments, discharge tube 126 can deposit excess substance 110 directly into reservoir 118, creating a closed circuit system 100 for distributing and recycling excess substance 110. Such a closed circuit system 100 can minimize the loss of any of substance 110 due to spills that can occur when manually collecting and transporting excess substance 110 to reservoir 118.

Figure 1B:
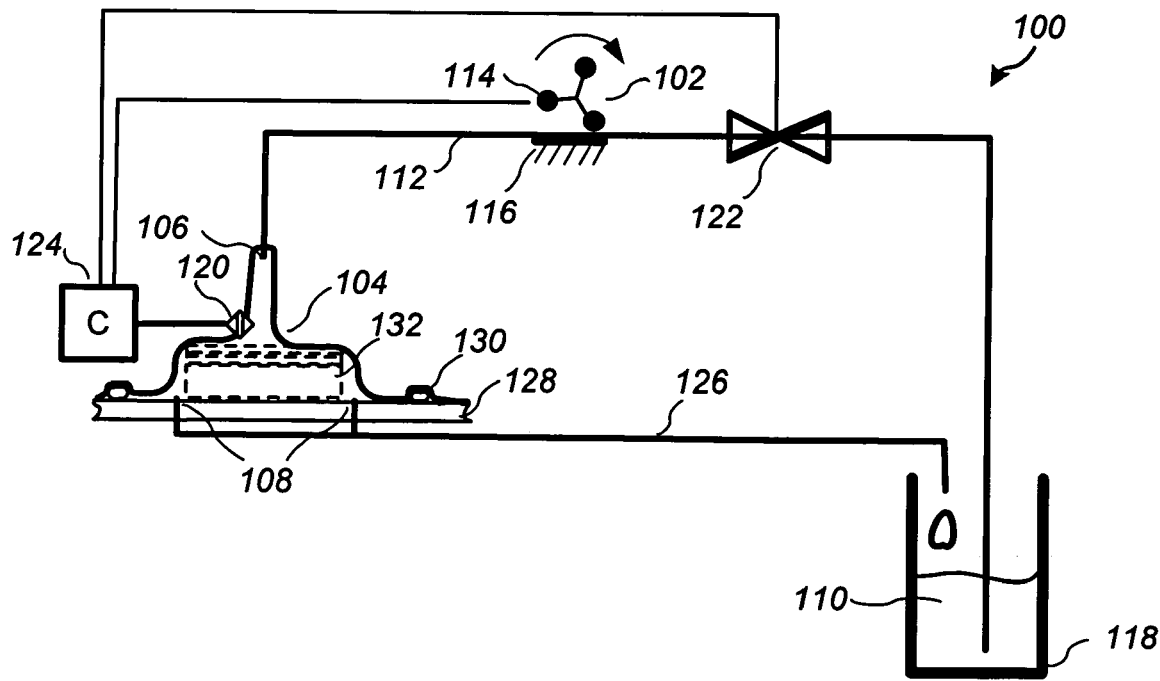
FIG. 1B is a schematic diagram of an embodiment of a system for distributing a substance with a peristaltic pump providing positive pressure.

FIG. 1B shows another embodiment of system 100 with input port 106 positioned at the top of chamber 104, and output ports 108 configured in the bottom of mold surface 128. Chamber 104 covers and is sealed to the top of mold surface 128 with airtight sealant 130 to form an airtight compartment. Sensor 120 is positioned near the top of lay-up 132 to detect excess substance 110 in chamber 104. Controller 124 receives signals from sensor 120 and can output signals to start and stop pump 102 and restrictor 122 based on the amount of substance 110 detected in chamber 104. Discharge tube 126 drains excess substance 110 into reservoir 118. The flow of excess substance 110 though outlet ports 108 is aided by gravity, however, a device such as another pump 102 or vacuum system (not shown) can be coupled to discharge tube 126 to further aid drainage of excess substance 110. Another flow restrictor 122 can be coupled to discharge tube 126, and controller 124, to control drainage of excess substance 110.

Figure 2:
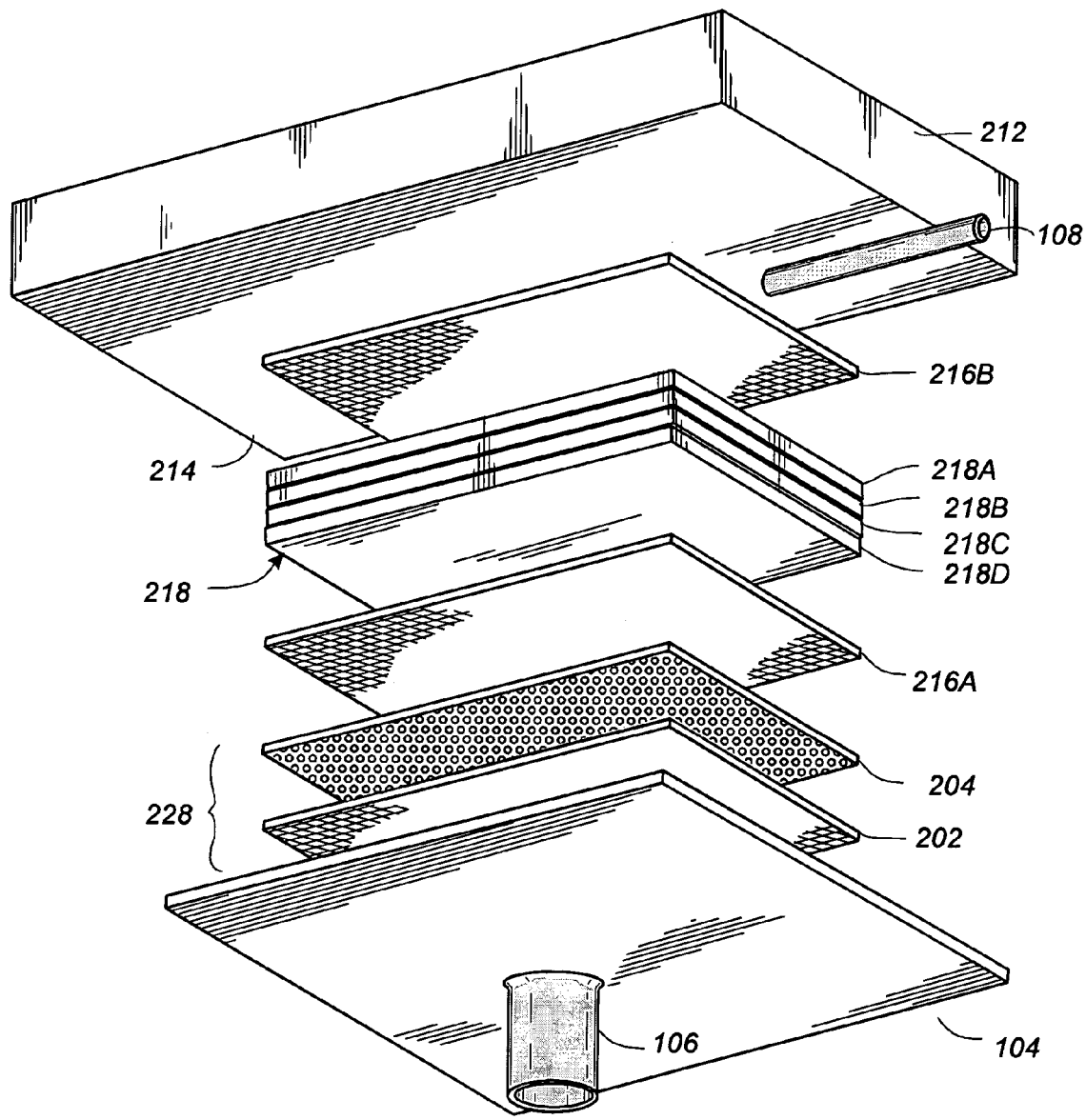
FIG. 2 is an exploded perspective view of an embodiment of a system for distributing a substance that can be utilized in the system of FIG. 1A.

Referring to FIGS. 1A and 2, FIG. 2 shows an embodiment of distribution system 200 for controlling the flow of liquid, gaseous, and particulate solid substances that can be utilized in system 100. Distribution system 200 includes distribution medium 202 and containment layer 204. Distribution medium 202 includes a first side facing an inflow of substance 110 and a second side facing containment layer 204. Containment layer 204 is designed to substantially prevent substance 110 from flowing to an intended destination until distribution medium 202 is substantially filled with substance 110.

Distribution system 200 can be utilized to fabricate a variety of components, including components fabricated with composite materials impregnated with resin. Chamber 104 houses a mold 212, shown with a flat mold surface 214, however mold surface 214 can be curved or have any desired shape. In some embodiments, peel ply layers 216A, 216B can optionally be positioned adjacent one or both of the outer sides of lay-up 218. Peel ply layers 216A, 216B are typically made of a porous material to allow a substance 110, such as resin to easily pass through without bonding to mold surface 214 or containment layer 204.

In some embodiments, the edges of chamber 104 are sealed to mold surface 214 by airtight sealant tape or other suitable means. An example of sealant tape that can be utilized is Tacky Tape™ manufactured by Schnee-Moorehead, Inc. of Irving, Tex. Outlet port 108 can be installed between mold surface 214 and chamber 104.

A vacuum source can be coupled to chamber 104 to create a differential pressure that causes chamber 104 to collapse around distribution medium 202. Distribution medium 202 facilitates even distribution of resin over lay-up 218, thereby reducing substance starved areas and voids that can otherwise be created in lay-up 218.

In some situations, the movement of substance 110 may be irregular due to varying thickness of the lay-up, complex curvatures, and/or other factors. In some embodiments, pump 102 forces substance 110 through supply tube 112 to help prevent irregular distribution of substance 110. Typically, inlet port 106 is placed at a low point in chamber 104 to allow air bubbles to rise with the flow of substance 110. However, one or more inlet ports 106 can be located anywhere in chamber 104. Containment layer 204 can be configured to prevent substance 110 from flowing until distribution medium 202 is substantially filled with substance 110.

Referring to FIG. 3B, another embodiment of a system 300 for distributing substance 110 is shown with pump 302 configured to pull excess substance 110 from chamber 104 by providing negative pressure on chamber 104. Discharge tube 126 is coupled between outlet port 108 on chamber 104 and an input port on reservoir 306. Pump 302 is positioned to move excess substance 110 through discharge tube 126 and creates a vacuum on the portion of discharge tube 126 between chamber 104 and pump 302. Reservoir 306 can be airtight to maintain the vacuum in discharge tube 126.

In some embodiments, a vent tube 310 can be included in closed reservoir 306. One or more pressure sensors (not shown) can be included in system 300 to indicate the pressure in discharge tube 126 and/or reservoir 306. The signals from the pressure sensor can be supplied to controller 124, and controller 124 can be configured to adjust a valve 312 on vent tube 310 to control pressure in reservoir 306. In some embodiments, vacuum regulator 314 can adjust valve 312 when excessive vacuum is pulled on supply reservoir 306.

In further embodiments, vacuum system 316 can be coupled to create a vacuum in chamber 104 prior to opening flow restrictor 122 and releasing substance 110. Vacuum system 316 can be coupled to a port 304 in chamber 104 by tube 320. Valve 322 can be included to maintain the vacuum when vacuum system 316 is not operating. Vacuum system 316 can be utilized to collapse chamber 104 after sufficient substance has been pulled into chamber 104 and flow restrictor 122 has been closed to stop the flow of substance 110.

The use of vacuum system 316 allows pump 302 to be turned off once the desired amount of substance 110 has entered chamber 104, thus extending the life of pump 302 and tubing 112.

In another embodiment of system 300 shown FIG. 3B, vacuum system 316 can be coupled to discharge tube 126 by tube 340 to draw a vacuum pressure on discharge tube 126. Valve 342 on tube 340 can be closed until discharge tube 126 is emptied of substance 110 to protect vacuum system 316 from accumulating any substance 110.

In other embodiments, as represented by FIG. 3C, vacuum system 316 can be connected by tube 350 to vent tube 310. Valve 352 can be coupled to tube 350 to isolate vacuum system 316 from any substance 110 in supply reservoir 306. If the time to cure the lay-up in chamber 104 allows, vacuum system 316 or another source of secondary vacuum (not shown) can be used to pull resin or substance 110 back out of chamber 104 after substance 110 is fully distributed.

Resin curing is an exothermic reaction, which increases the temperature of some resin substances 110, further accelerating the reaction. Such excessive heat can have undesirable side effects, such as degrading mechanical and physical properties of the end product. Excessive heat can also create thermal shrinkage gradients, residual stresses, and cracking. Additionally, excessive heat can boil volatiles (such as styrene) within the resin, and create excessive porosity, which also degrades mechanical and physical properties of the end product.

To control the temperature of substance 110, supply tube 112 and/or discharge tube 126 can be routed adjacent to a heating or cooling device 354. Device 354 can include a water jacket, an enclosure, or adjacent tube created from heated or refrigerated tubes, a cooling or heating chamber, or other suitable means for adjusting the temperature of substance 110 in transit. Cooling can be used to prevent or delay an exothermic process that cures certain types of resin substances. Heating can be used to promote curing of other types of resin substances.

When traditional vacuum pumps or a standard vacuum system is utilized in traditional processes, there is the danger of clogging tubes and pumps when excess substance is present or as the substance cures. The traditional approach calls for manually collecting the excess substance or resin by opening valves on traps to allow the filling of collection containers. Typically, an open system is used, and the system must be continuously monitored. The vacuum must be temporarily shut off, or vessels quickly switched or pumped off, when they approach fullness. The substance collected is then discarded or manually poured into the substance inlet or substance supply chamber. Some embodiments allow all valves to remain open, or set in pre-selected positions, while pump 302 continuously recirculates substance 110. Pump 302 will continue to run and supply pressure or vacuum on chamber 104 even as substance 110 begins to gel. In some embodiments, the same tubing 112 can be used both to supply the vacuum or pressure and as a conduit for recirculating substance 110.

One of the advantages of using peristaltic pump 302, especially in operations such as RTM, VARTM, and resin infusion, is providing a system 300 that is easy to clean and maintain, while preventing contamination of substance 110. In embodiments where supply reservoir 306 is a closed vessel, the use of peristaltic pump 302 can protect substance 110 from exposure to air and moisture contained in the air.

In some embodiments, supply tube 112 and discharge tube 126 can be pumped virtually clean. If flow restrictor 122 is placed immediately after supply reservoir 118 to prevent substance 110 from entering supply tube 112, the system can empty itself. Tubing 112 can be removed, any residue of substance 110 can be allowed to harden, and then the non-hazardous solid substance 110 can be removed or discarded with tubing 112, 126. Alternatively, tubing 112, 126 can be cleaned with solvents or other cleaning solutions. With a closed loop system, there is no danger of the incidental spills or exposure to fumes that typically exist when open vessels of substance 110 are transported and deposited back into reservoir 118, 306. Pump 302 is isolated from substance 110, and does not require cleaning.

Moreover, under proper conditions, use of peristaltic pump 302 enables unused substance 110 to be recirculated back to supply reservoir 118, 306 and further allows the entire apparatus to be automatically controlled by controller 124 resulting in an entirely automated system. If desired, a conventional industrial computer or central processing unit used to automatically control a mold clamp or press, can be interfaced with controller 124 to further automate the manufacturing process.

In other embodiments of the system, a plurality of pumps 102, 302 can be used to support system 100, 300. A peristaltic pump 102, 302 will be limited in size based on the ability of rollers 114 to supply sufficient pressure to compress tubing 112 of a large cross section or inelastic material. One pump 102, 302 can also be configured with multiple tubes 112 to supply a single lay-up or multiple lay-ups in chamber 104.

In other embodiments, supply tube 112 and discharge tube 126 can be made from flexible lengths of piping so that chamber 104 can be moved into an autoclave (not shown) for curing. In such embodiments, supply tube 112 and discharge tube 126 are fabricated using material that withstand the temperatures of the autoclave. In other embodiments, supply tube 112 and discharge tube 126 can be removed from ports 106, 108, and a plug can be positioned in ports 106, 108 to maintain the desired pressure in chamber 104.

Figure 4:
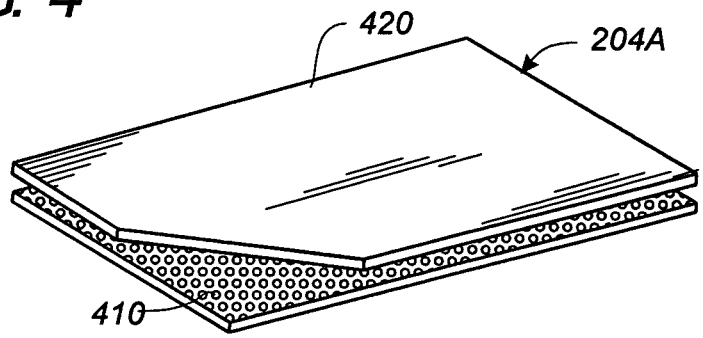
FIG. 4 is an enlarged perspective view of an embodiment of a containment layer, wherein the containment layer is made of material that melts.

Referring to FIGS. 2 and 4, an embodiment of a temperature sensitive containment layer 204A is shown. In some embodiments, temperature sensitive containment layer 204A includes a meltable substance layer 410 and fabric ply 420 or other suitable material. An example of a suitable material for temperature sensitive containment layer 204A for use with resin is Blue Max Tak Tu on fabric, manufactured by The Blue Max Company, of Anaheim, Calif. The Blue Max Tak Tu material is a low temperature melting resin layer 410 that is applied to a fabric ply 420. Containment layer 204A has a melting point that causes containment layer 204A to at least partially dissolve or melt after substance 110 is at least partially distributed in distribution medium 202. Once containment layer 204A melts, substance 110 (FIG. 1A) can flow to its intended destination. System 100, 300 can include means for applying heat to temperature sensitive containment layer 204A. Heat can be applied directly by means such as raising the ambient temperature, blowing heated air, conducting electricity through a metallic frame, chemical reaction, or other suitable means. Heat can also be applied to substance containment layer 204A by heating the substance 110, before, during, or after substance 110 contacts containment layer 204A. Other materials that dissolve under other conditions, such as when exposed to certain chemicals, can be used for containment layer 204A in addition to, or instead of, temperature sensitive containment layer 204A.

Figure 5:
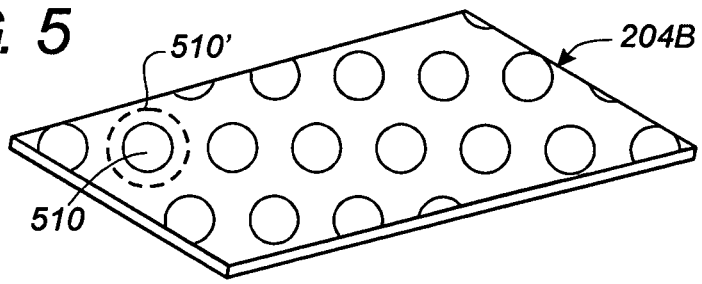
FIG. 5 is a perspective view of another embodiment of the containment layer, wherein the containment layer is made of a perforated heat shrinkable material.

Referring to FIG. 5, another embodiment of containment layer 204B includes a plurality of holes 510 in a heat shrinkable material. Holes 510 are sized to prevent flow of substance 110 at ambient temperatures. Upon heating, containment layer 204B will shrink, causing holes 510 to increase in size, as indicated by dashed holes 510', allowing substance to flow from distribution medium 202. A suitable heat shrinkable material for use with resin substances includes Intercept Shrink film manufactured by FPM, Incorporated, Brownstone, Me.

Figure 6:
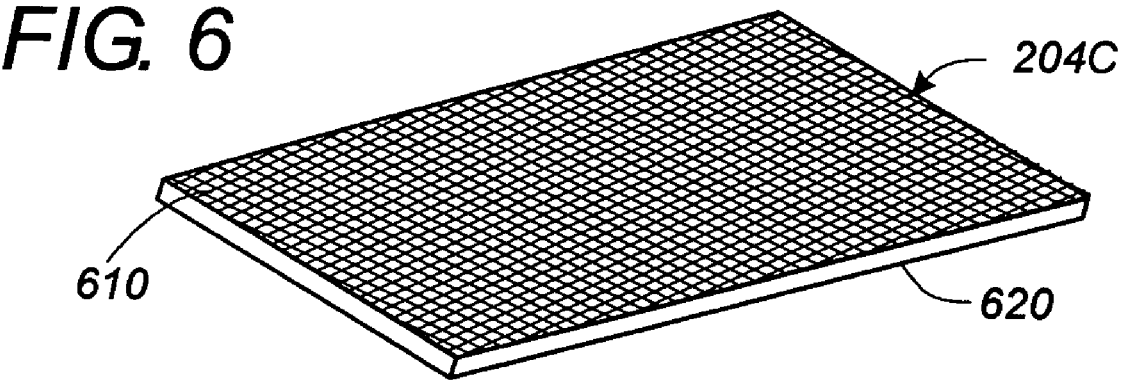
FIG. 6 is a perspective view of another embodiment of the containment layer, wherein the containment layer is made of a highly perforated or highly embossed, frangible material.
Figure 6A:
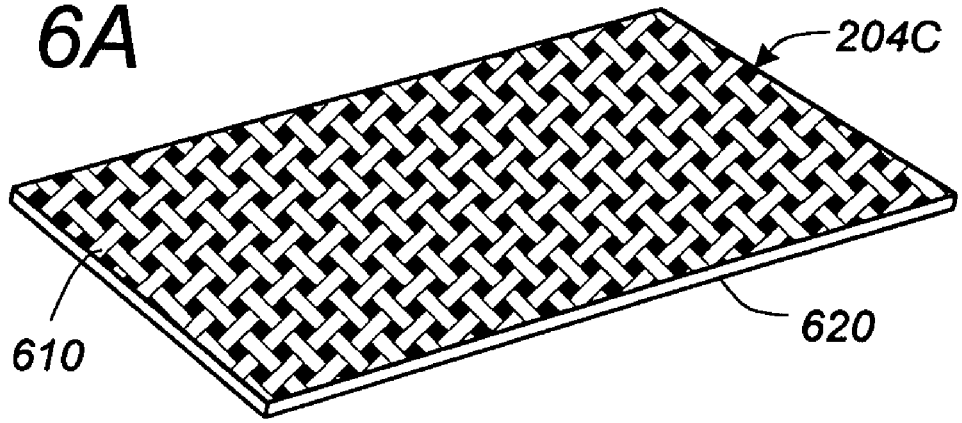
FIG. 6A is partial enlarged view of FIG. 6.

Referring to FIGS. 6 and 6A, in some embodiments, containment layer 204C is a porous film 610 including a plurality of holes or very closely spaced perforations 620. The size of the perforations is selected to prevent or greatly reduce substance flow through containment layer 204C. Holes 620 having a size such that substance 110 (FIG. 1A) will not flow there through when a vacuum is applied to outlet port 304 (FIG. 3A) at a first rate and will flow there through when a vacuum is drawn from outlet port 304 at a higher second rate.

A suitable material for the containment layer 204C for use with resin substances is Easy Gardner Tree Wrap having round or square holes of a suitable size based on the viscosity of the resin. Both of these materials are manufactured by Easy Gardner, Incorporated of Waco, Tex.

In still other embodiments of distribution system 228, containment layer 204 can be comprised of a layer of perforated material including a plurality of embossed holes. Sufficient pressure can be applied to containment layer 204 to cause the perforations to release and allow the substance to flow once it is distributed in distribution medium 202. Chamber 104 can be modified to include means for applying pressure to the substance in distribution layer 204 to induce tearing of the holes in containment layer 204. Such means include physically applying pressure to the substance, applying vacuum pressure, such as by drawing a vacuum on chamber 104, or other suitable means. Containment layer 204 can also be configured to tear upon application of sufficient weight of substance 110. Distribution medium 202 can be configured to allow sufficient substance 110 to accumulate to apply the required weight to containment layer 204.

Other embodiments include containment layer 204 fabricated from materials whose porosity properties change under application of different rates of vacuum, different rates of atmospheric pressure, and varying heat. Substances that can be distributed with distribution system 228 include any amounts of liquid, solid, and/or gaseous substances. Distribution medium 202 can be fabricated from any suitable material or combination of materials, and can include grids or other suitable openings to distribute the substance.

Various embodiments can include two or more distribution systems 228 that are configured to allow substances to be combined automatically at desired pre-selected time intervals, or upon application of means to at least partially remove containment layer 204 to allow the substance to flow toward its intended destination. For example, containment layer 204 in one distribution system 228 can be configured to release the substance when activated by an operator. The distributed substance can flow onto and chemically react with another substance in a second distribution system 228. Containment layer 204 can be configured to release the combined substances either manually or automatically once the chemical reaction is complete.

Distribution medium 202 can be configured to accumulate all or a portion of the substance to be distributed by increasing the depth of the grid, including side walls around the perimeter of distribution medium 202, or other suitable structure. Further, distribution system 228 can be oriented to allow substance to flow in any desired direction.

While the present disclosure describes various embodiments and variations, these embodiments are to be understood as illustrative and do not limit the claim scope. Many variations, modifications, additions and improvements of the described embodiments are possible. For example, those having ordinary skill in the art will readily implement the structures and methods disclosed herein, and will understand that any process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. In the claims, unless otherwise indicated, the article "a" is to refer to "one or more than one."

What is claimed:

1. A system for controlling the flow of a substance, comprising:
    a chamber configured to accommodate a mold surface;
    an inlet port in the chamber, wherein the substance is introduced into the chamber through the inlet port;
    flexible tubing coupled between the inlet port and a reservoir containing the substance;
    a pump operable to compress a portion of the flexible tubing to move the substance through the tubing and inject the substance into the chamber;
    a containment layer positioned between the mold surface and the inlet port; and
    a distribution medium positioned between the containment layer and the inlet port; wherein the containment layer substantially prevents the substance from flowing from the distribution medium to the mold until the distribution medium is substantially filled with the substance, the containment layer is selected from materials whose porosity increases under an increase of at least one of the group of: vacuum force, atmospheric pressure, and temperature.

2. The system as set forth in claim 1, wherein the pump includes at least one roller configured to rotate in a circular path adjacent a portion of the flexible tubing, wherein the roller compresses the tubing when the roller contacts the tubing.

3. The system as set forth in claim 1, further comprising:
a discharge tube coupled between the chamber and the reservoir, wherein excess substance is collected in the discharge tube and deposited in the reservoir.

4. The system as set forth in claim 1, wherein the pump operates to provide positive pressure on the chamber.

5. The system as set forth in claim 1, further comprising a flow restrictor coupled to the flexible tubing and operable to control the flow of the substance to the chamber.

6. The system as set forth in claim 3, further comprising a sensor operable to detect the excess substance in the chamber.

7. The system as set forth in claim 6, further comprising a computerized controller configured to receive signals from the sensor and to adjust the flow restrictor based on the signals from the sensor.

8. The system as set forth in claim 1, further comprising a peel ply layer positioned adjacent to the substance.

9. A system for controlling the flow of a substance, comprising:
discharge tubing couplable between an outlet port in a chamber and a reservoir containing the substance;
a pump operable to compress a portion of the discharge tubing to move the substance from the chamber through the tubing, and deposit excess substance into the reservoir; and
a containment layer positioned between the mold surface and the inlet port; and
a distribution medium positioned between the containment layer and the inlet port; wherein the containment layer substantially prevents the substance from flowing from the distribution medium to the mold until the distribution medium is substantially filled with the substance, the containment layer is selected from materials whose porosity increases under an increase of at least one of the group of: vacuum force, atmospheric pressure, and temperature.

10. The system as set forth in claim 9, wherein the pump is operable to provide negative pressure on the chamber.

11. The system as set forth in claim 9, further comprising a vent in the reservoir, wherein the opening to the vent is adjustable to relieve pressure in the flexible tubing and the reservoir.

12. The system as set forth in claim 9, further comprising a vacuum system coupled to a port in the chamber.

13. The system as set forth in claim 9, further comprising a vacuum system coupled to the discharge tube.

14. The system as set forth in claim 9, further comprising a flow restrictor coupled to the discharge tube.

15. The system as set forth in claim 9, further comprising a device for controlling the temperature of the substance in at least one of: the discharge tube, the chamber, and the reservoir.

16. A system for controlling the flow of a substance comprising:
a flexible tube coupled between a peristaltic pump and an airtight chamber, one end of the flexible tube is configured to draw the substance from a reservoir and the other end of the flexible tube is configured to input the substance into the chamber;
a peristaltic pump configured to form a differential pressure within the chamber;
a distribution medium for receiving the substance; and
a containment layer adjacent to the distribution medium wherein the containment layer substantially prevents the substance from flowing until the distribution medium is substantially filled with substance, and the containment layer is selected from materials whose porosity increases under an increase of at least one of the group of: vacuum force, atmospheric pressure, and temperature.

17. The system as set forth in claim 16, further comprising:
a mold surface within the chamber; and
a lay-up of material on the mold surface.

18. The system as set forth in claim 16, further comprising the peristaltic pump provides positive pressure in the chamber.

19. The system as set forth in claim 16, further comprising a flow restrictor coupled to the flexible tubing to control flow of the substance into the chamber.

20. The system as set forth in claim 16, further comprising the peristaltic pump is configured to provide negative pressure in the chamber.

21. The system as set forth in claim 16, further comprising the excess substance is collected through a discharge tube coupled to an outlet port in the chamber, and the excess substance is deposited in a reservoir.

22. The system as set forth in claim 21, further comprising a sensor device to sense the excess substance and send a signal to a controller when the excess substance reaches a predetermined level in the chamber.

23. The system as set forth in claim 22, further comprising a flow restrictor coupled to the discharge tube, the flow restrictor being controlled based on the sensor signal.

24. The system as set forth in claim 21, further comprising the reservoir includes a vent for controlling the pressure in the reservoir.

25. The system as set forth in claim 16, further comprising a vacuum system configured to form the differential pressure.

26. The system as set forth in claim 21, further comprising a vacuum system configured to pull the excess substance out of the chamber.

27. The system as set forth in claim 21, further comprising another pump configured to pull the excess substance out of the chamber.

* * * * *